US006853563B1

United States Patent
Yang et al.

(10) Patent No.: US 6,853,563 B1
(45) Date of Patent: Feb. 8, 2005

(54) PRIMARY-SIDE CONTROLLED FLYBACK POWER CONVERTER

(75) Inventors: Ta-yung Yang, Milpitas, CA (US);
Jenn-yu G. Lin, Taipei (TW);
Chern-Lin Chen, Taipei (TW)

(73) Assignee: System General Corp., Taipei Hsien (TW)

(*) Notice: Subject to any disclaimer, the term of this patent is extended or adjusted under 35 U.S.C. 154(b) by 22 days.

(21) Appl. No.: 10/629,103

(22) Filed: Jul. 28, 2003

(51) Int. Cl.[7] .............................................. H02M 3/335
(52) U.S. Cl. .............................. 363/21.15; 363/56.12; 363/49; 363/21.18
(58) Field of Search ................................. 363/21.15, 49, 363/56.12, 21.17, 21.18

(56) References Cited

U.S. PATENT DOCUMENTS

| | | | | |
|---|---|---|---|---|
| 4,975,823 A | * | 12/1990 | Rilly et al. | 363/21.16 |
| 6,118,675 A | * | 9/2000 | Lionetto et al. | 363/21.13 |
| 6,233,161 B1 | | 5/2001 | Balakrishnan et al. | 363/16 |
| 6,434,021 B1 | | 8/2002 | Collmeyer et al. | 363/21.01 |
| 6,480,399 B2 | | 11/2002 | Balakrishnan et al. | 363/16 |
| 6,538,908 B2 | | 3/2003 | Balakrishnan et al. | 363/95 |

* cited by examiner

Primary Examiner—Shawn Riley
(74) Attorney, Agent, or Firm—J.C. Patents

(57) ABSTRACT

The present invention provides a primary-side flyback power converter that supplies a constant voltage output and a constant current output. To generate a well-regulated output voltage under varying load conditions, a PWM controller is included in the power converter in order to generate a PWM signal controlling a switching transistor in response to a flyback voltage sampled from a first primary winding of the power supply transformer. Several improvements are included in this present invention to overcome the disadvantages of prior-art flyback power converters. Firstly, the flyback energy of the first primary winding is used as a DC power source for the PWM controller in order to reduce power consumption. A double sample amplifier samples the flyback voltage just before the transformer current drops to zero. Moreover, an offset current is pulled from a detection input of the double sample amplifier in order to generate a more accurate DC output voltage. The offset current is generated in response to the temperature in order to compensate for temperature-induced voltage fluctuations across the output rectifier. Ultimately, in order to maintain a constant output current, the PWM controller modulates the switching frequency in response to the output voltage.

16 Claims, 10 Drawing Sheets

PRIMARY-SIDE CONTROLLED FLYBACK POWER CONVERTER

BACKGROUNDING OF THE INVENTION

1. Field of Invention

The present invention relates to a switching mode power converter and more particularly relates to a flyback power converter.

2. Description of Related Art

A flyback power converter typically includes a PWM controller, a power MOSFET (Metal Oxide Semiconductor Field Effect Transistor), a transformer, and a feedback-control circuit. The purpose of the feedback-control circuit is to sense the output voltage and/or the output current of the secondary-side of the power supply, and to supply a feedback signal to the PWM controller through an isolated device such as an optical-coupler.

FIG. 1 shows a traditional flyback power converter. Although this circuit is able to regulate the output voltage and output current, it has several drawbacks. One drawback of this circuit is its large size, due to the need for an optical-coupler and a secondary feedback-control circuit. Another drawback of this flyback power converter is high power consumption. To maintain a constant secondary-side output current, this circuit includes a current-sense resistor. The current-sense resistor significantly increases the power consumption of the power converter.

In recent years, several primary-side control schemes for flyback power converters have been proposed. These prior-art primary-side control schemes have attempted in various ways to reduce the size and the cost of flyback power converters. One prior-art primary-side control scheme is "Switching Power Supply Packages" by Arthur J. Collmeyer, Mark D. Telefus, Dickson T. Wong, and David B. Manner (U.S. Pat. No. 6,434,021). Although this circuit is able to regulate the output voltage and the output current, it has several drawbacks. One drawback of this prior-art invention is that the feedback control voltage is sensed from a high voltage source. This method results in a loss of accuracy, and it increases the cost of the controller. Another drawback is that the voltage drop of the output rectifier is not compensated for. Generally, the voltage drop of the output rectifier decreases in response to temperature increases, typically at a rate of 2 mV/° C. Thus, the output voltage of this prior-art invention will deviate significantly from a constant DC level.

Another prior-art control scheme is "Method and Apparatus Providing a Multi-Function Terminal for a Power Supply Controller" by Balu Balakrishnan, Alex B. Djenguerian, and Leif O. Lund (U.S. Pat. No. 6,538,908). The drawback of this prior-art is that the optical-coupler and the secondary feedback circuit are still required for loop control. Otherwise, the output voltage and the output current will fluctuate significantly.

Reflected voltage control has also been proposed as a means for primary-side control. Two prior-art patents teaching this method include "Switched Mode Power Supply Responsive to Voltage across Energy Transfer Element" by Balu Balakrishnan, David Michael, and Hugh Matthews (U.S. Pat. No. 6,233,161) and "Switched Mode Power Supply Responsive to Current Derived from Voltage across Energy Transfer Element Input" by Balu Balakrishnan, David Michael, and Hugh Matthews (U.S. Pat. No. 6,480,399).

One principal drawback of these two prior-arts is inaccurate feedback control. In order to generate a feedback control signal, the reflected voltage of the transformer is filtered and turned into a DC voltage (or current) through a resistor-capacitor circuit. However, this reflected voltage signal is not directly proportional to the output voltage, because of the spike voltage generated by the leakage inductance of the transformer. Thus, the output voltage of this prior-art invention will deviate significantly from a constant DC level. Furthermore, the voltage drop of the output rectifier is not compensated for in the feedback loop. When load changes occur, this problem will introduce additional distortion into the output voltage.

Another drawback of these two prior-art inventions is high power consumption. The reflected voltage is filtered to supply power for PWM control. However, the resistor in the filter burns the majority of the reflected power, even if the power consumption required for PWM control is low. Therefore, the power consumption of the power supply is high.

Thus, a need still remains for an efficient primary-side flyback power converter with a well regulated, constant, output voltage and output current.

SUMMARY OF THE INVENTION

A principal object of the present invention is to provide a flyback power converter under primary-side PWM control. The flyback power converter according to the present invention supplies a well-regulated constant voltage and constant current output. However, unlike prior-art PWM controllers, it does not require a secondary-side feedback circuit or an optical-coupler. This enables the device count, the size, and the cost of the power supply to be reduced.

A further object of the present invention is to solve the drawbacks of the foregoing prior-art inventions.

A further object of the present invention is to reduce power consumption. To achieve this, the present invention provides a PWM controller with a power supply that has a low-voltage source.

A further object of the present invention is to improve the DC output voltage accuracy and reduce the cost of the PWM controller. To achieve this, the present invention uses a low voltage input to detect the output voltage.

Another object of the present invention is to further improve DC output voltage accuracy. The present invention includes a double sample amplifier that precisely acquires a sampled voltage from a flyback voltage of the transformer, in a manner such that the sampled voltage is compensated and tightly-correlated to the output voltage.

The primary-side PWM controller according to the present invention can provide a well-regulated output voltage and output current. This allows the device count, the size, and the cost of the power converter to be greatly reduced.

The flyback power converter according to the present invention includes the PWM controller that generates a PWM signal to drive a switching transistor. The PWM signal is generated in response to the sampled voltage.

The flyback energy from the primary winding of the transformer is recycled to reduce power consumption. After the falling-edge of the PWM signal, the flyback energy of the primary winding is rectified and filtered to supply DC power to the PWM controller. This flyback energy includes the flyback voltage reflected from the secondary winding and an induced voltage caused by the leakage inductance.

Another feature of the flyback power converter according to the present invention is a pulse generator. The pulse generator of the PWM controller generates sampling pulses after each delay time interval. The sampling pulses are used to accurately detect the flyback voltage of the transformer. The delay time is inserted to avoid interference from the induced voltage created by the leakage inductance of the transformer. The double sample amplifier samples the flyback voltage just before the amplitude of the transformer current falls to zero. This method of sampling compensates for load-related voltage variations across the output rectifier.

Another feature of the flyback power converter according to the present invention is an offset current source. The offset current source is used to compensate for the temperature dependence of the output rectifier. This allows the PWM controller to be supplied with a more accurate feedback signal. The offset current source of the PWM controller pulls an offset current from an input of the double sample amplifier in response to the operating temperature of the flyback power converter. The offset current will produce a voltage drop across a detection resistor to compensate for voltage variations across the output rectifier.

Another feature of the flyback power converter according to the present invention is a blanking circuit. The blanking circuit produces a blanking time to ensure that the on-time of the PWM signal will create a sufficient delay to precisely sample the flyback voltage.

Another feature of the flyback power converter according to the present invention is the use of an oscillator in the PWM controller to produce a progranunable switching frequency. The programmable switching frequency is produced in response to the voltage sampled from the flyback voltage. The programmable switching frequency is used by the flyback power converter to control the amount of power delivered from the primary-side of the transformer to the output of the power converter.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
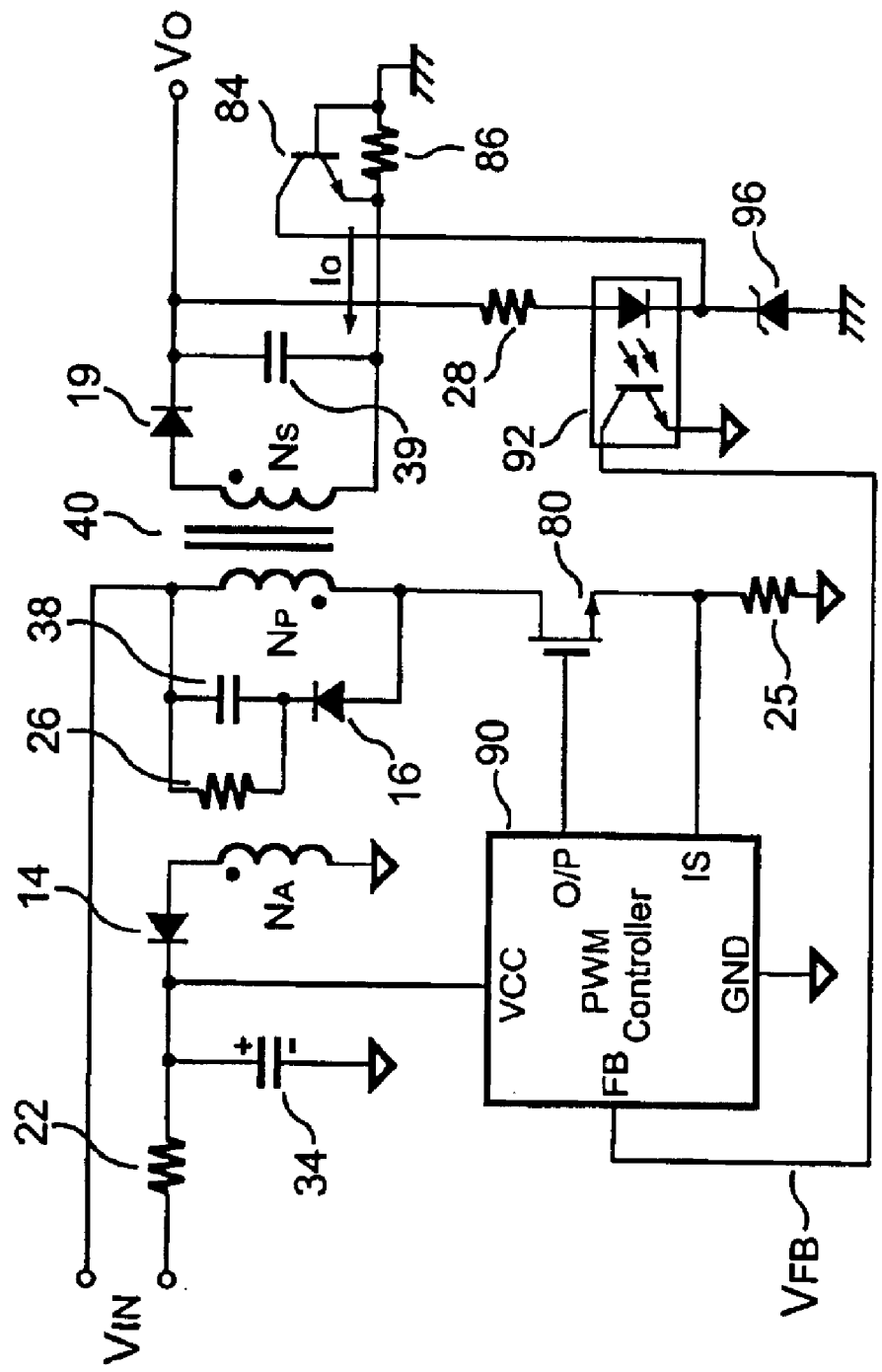
FIG. 1 shows a traditional prior-art flyback power converter.

FIG. 1 shows a traditional flyback power converter. A capacitor 34 is connected to a PWM controller 90 and is charged via a resistor 22. The PWM controller 90 will be started up once its supply voltage $V_{CC}$ is higher than a start-threshold voltage. When the PWM controller 90 starts to operate, it will output a PWM signal to drive a switching transistor 80 and a transformer 40. Meanwhile, an auxiliary winding $N_A$ of the transformer 40 supplies the supply voltage $V_{CC}$ via a rectifier 14. A current-sense resistor 25 converts a switching current of the transformer 40 into a voltage signal for PWM control and over-power protection. An output of an optical-coupler 92 supplies a feedback voltage $V_{FB}$.

The output voltage $V_O$ and the Zener voltage of a Zener diode 96 drive an input of the optical-coupler 92 via a resistor 28 to form the feedback loop. The magnitude of the feedback voltage $V_{FB}$ of the PWM controller 90 determines the on-time ($T_{ON}$) of the PWM signal and regulates the output power. A transistor 84 coupled with a current-limit resistor 86 control the maximum amplitude of the output current $I_O$. As the output current $I_O$ increases, the voltage across the current-limit resistor 86 increases as well. When this voltage exceeds the junction voltage of the transistor 84 (e.g., 0.7V), the transistor 84 will be turned on. This reduces the on-time of the PWM signal by decreasing the feedback voltage $V_{FB}$. In this manner, the output current $I_O$ of the power supply is kept constant.

Figure 2:
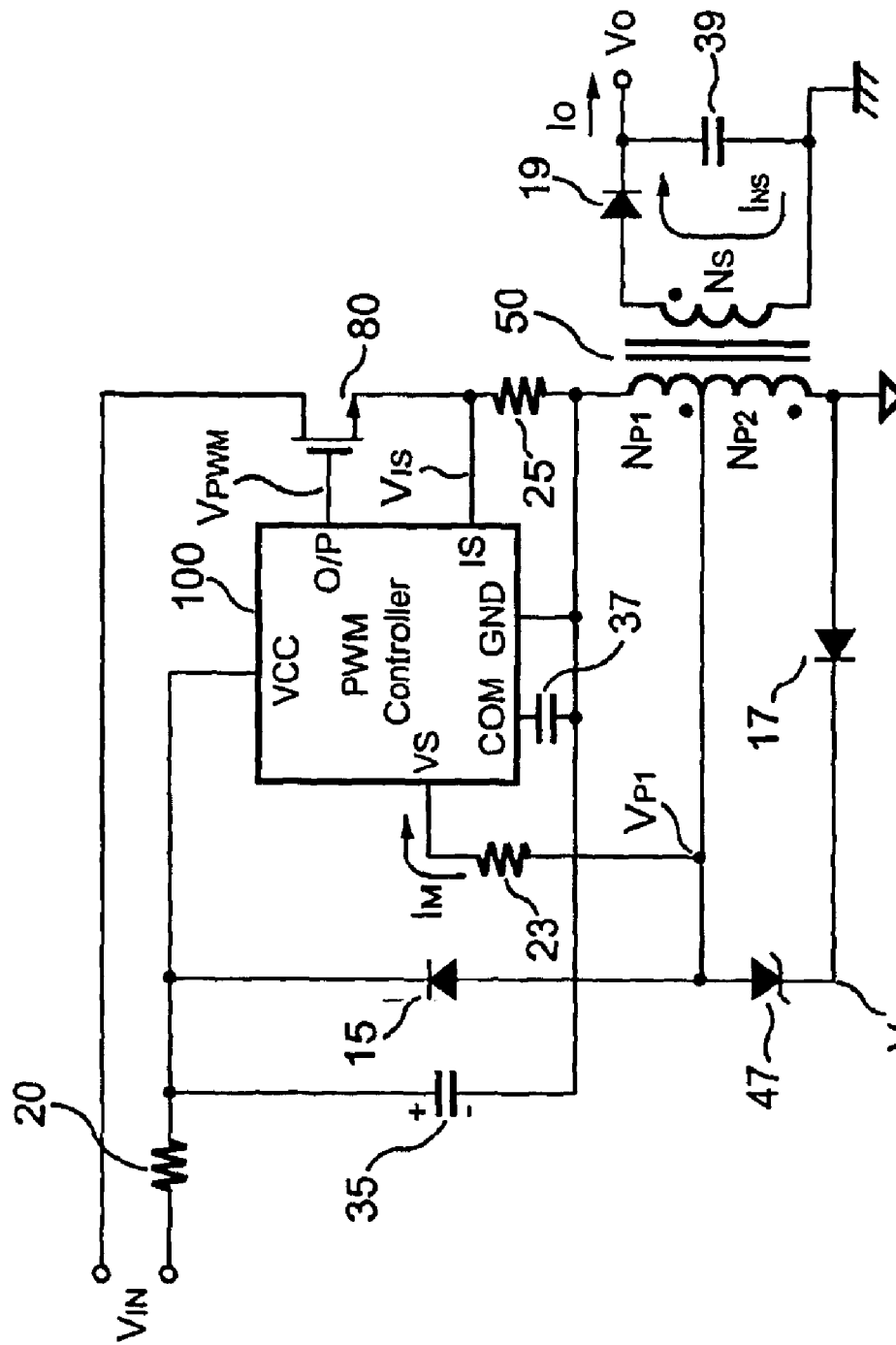
FIG. 2 shows a primary-side controlled flyback power converter according to the present invention.

FIG. 2 shows a flyback power converter according to the present invention. The flyback power converter supplies a constant output voltage and a constant current output under primary-side PWM control. An input VIN of the power converter is connected to a drain of a switching transistor 80. A first primary winding $N_{P1}$ and a second primary winding $N_{P2}$ are connected in series to construct a primary winding of a transformer 50. A first terminal of the primary winding is a first terminal of the first primary winding $N_{P1}$, and a second terminal of the primary winding is a second terminal of the second primary winding $N_{P2}$. A second terminal of the first primary winding $N_{P1}$ is connected to a first terminal of the second primary winding $N_{P2}$. The transformer 50 further comprises a secondary winding $N_S$.

The secondary winding $N_S$ of the transformer 50 is connected to an output of the power converter via an output rectifier 19. A source of the switching transistor 80 is connected via a current-sense resistor 25 to the first terminal of the primary winding of the transformer 50. The second terminal of the primary winding is connected to the ground reference. When power is applied to the input $V_{IN}$ of the power converter, a capacitor 35 is charged up via a start-up resistor 20. The capacitor 35 is connected to a supply-voltage input VCC of a PWM controller 100. The capacitor 35 stores energy that is used by the PWM controller 100.

Once the voltage at the supply-voltage input VCC of the PWM controller 100 exceeds the start-threshold voltage, the PWM controller 100 will start to operate and generate a PWM signal $V_{PWM}$. The PWM signal $V_{PWM}$ will drive a gate of the switching transistor 80 to deliver energy to the output of the power converter. At the instant the PWM signal turns off, a flyback voltage will be reflected from the secondary winding $N_S$ to the first primary winding $N_{P1}$ and the second primary winding $N_{P2}$. The voltage across the secondary winding $N_S$ is equal to the sum of the voltage drop across the output rectifier 19 and the output voltage $V_O$ of the power converter.

The PWM controller 100 has a detection input VS for sampling the flyback voltage $V_{P1}$ from the first primary winding $N_{P1}$. This is used to regulate the output voltage $V_O$. The PWM controller 100 regulates the output voltage of the power converter by modulating the PWM signal $V_{PWM}$ in response to the voltage sampled at the detection input VS. While the PWM signal $V_{PWM}$ is on, a primary current of the transformer 50 will produce a current-sense voltage $V_{IS}$ across the current-sense resistor 25. A capacitor 37 is connected from the COM input of the PWM controller 100 to the ground reference. The capacitor 37 is used for frequency compensation to stabilize the control loop of the power converter.

A sense-junction connects the source of the switching transistor 80 and the current-sense resistor 25. The sense junction is connected to a current-sense input IS of the PWM controller 100. The current-sense input IS detects the current-sense voltage $V_{IS}$, so that the PWM controller 100 can successfully limit the peak value of the primary current flowing through the transformer 50.

An anode of a diode 15 is connected to the second terminal of the first primary winding $N_{P1}$. A cathode of the diode 15 is connected to the supply-voltage input VCC of the PWM controller 100. After the PWM signal $V_{PWM}$ turns off, the rectified flyback voltage of the first primary winding $N_{P1}$ is supplied to the supply-voltage input VCC of the PWM controller 100 via the diode 15. The capacitor 35 filters this rectified flyback voltage to supply the PWM controller 100 with a DC power source.

One component of the voltage supplied to the supply-voltage input VCC of the PWM controller 100 is from the flyback voltage reflected from the secondary winding $N_S$. However, the voltage supplied to the supply-voltage input VCC of the PWM controller 100 also includes an induced voltage from the leakage inductance of the transformer 50. This flyback energy of the first primary winding $N_{P1}$ of the transformer 50 is recycled to power the PWM controller 100, thus reducing power consumption.

The flyback energy of the second primary winding $N_{P2}$ of the transformer 50 is not utilized. Consequently, to eliminate the induced voltage caused by the leakage inductance of the second primary winding $N_{P2}$ of the transformer 50, a snubber circuit is connected in parallel with the second primary winding $N_{P2}$. The snubber circuit comprises a diode 17 connected in series with a voltage-clamping device 47. The voltage-clamping device can either be a Zener diode or a TVS (Transient Voltage Suppressor).

Figure 3:
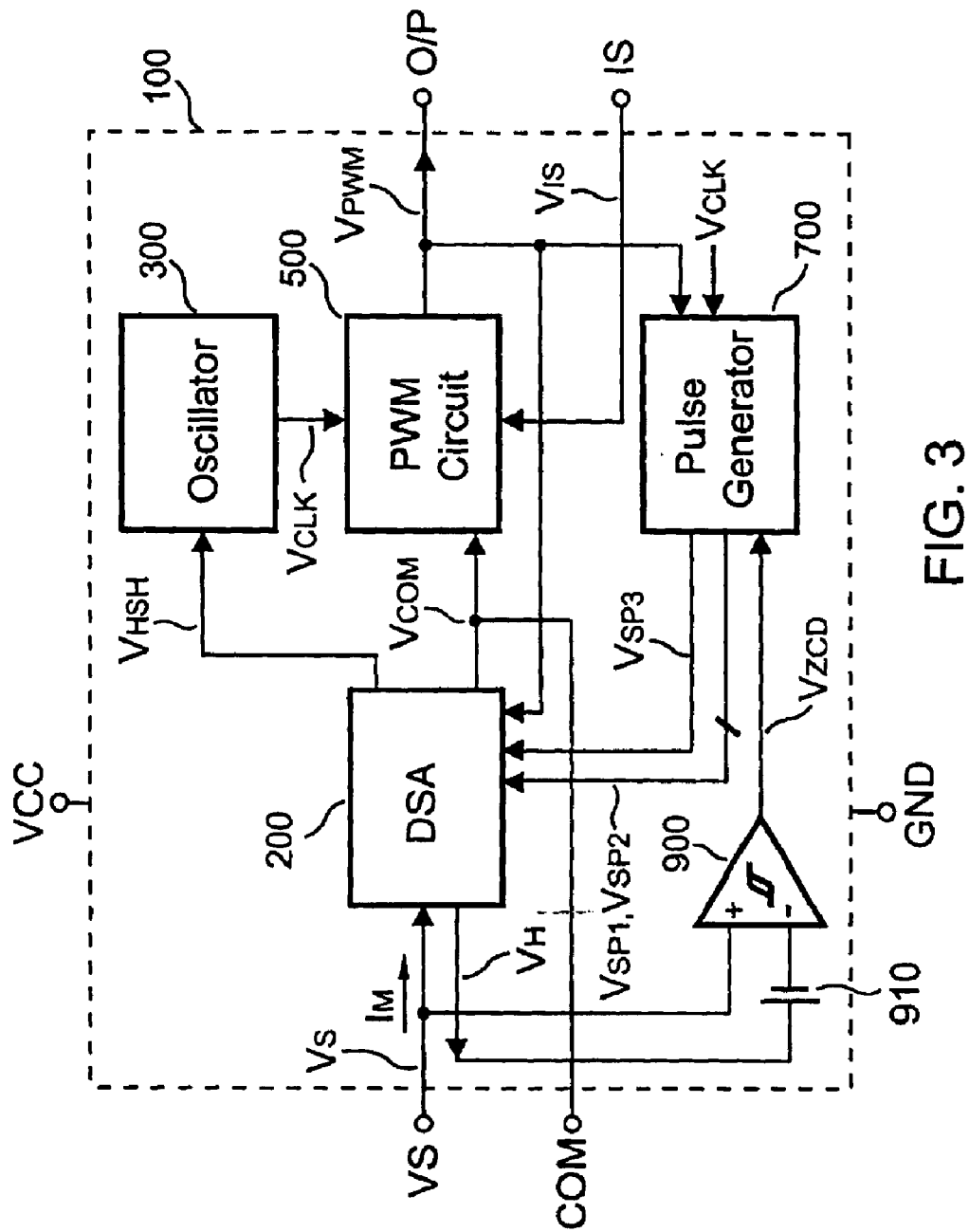
FIG. 3 shows a preferred embodiment of a PWM controller according to the present invention.

FIG. 3 shows a preferred embodiment of the PWM controller 100 including a double sample amplifier (DSA) 200, an oscillator 300, a PWM circuit 500, a pulse generator 700, a zero current detection (ZCD) comparator 900, and a threshold voltage 910. When the PWM signal $V_{PWM}$ is off, the pulse generator 700 generates a sampling pulse $V_{SP1}$ and a sampling pulse $V_{SP2}$ alternately. The sampling pulse $V_{SP1}$ and the sampling pulse $V_{SP1}$ are generated following a delay time $T_d$. The delay time $T_d$ is chosen such that the flyback voltage of the first primary winding $N_{P1}$ of the transformer 50 can be sampled. The delay time $T_d$ is needed to avoid sampling the induced voltage from the leakage inductance of the transformer 50.

Once the ZCD comparator 900 detects a zero current status from the transformer 50, the pulse generator 700 will be inhibited to generate the sampling pulse $V_{SP1}$ and the sampling pulse $V_{SP2}$. In the mean time, the feedback signals sampled during the sampling pulses $V_{SP1}$ and $V_{SP2}$ are stored in a signal buffer of the double sample amplifier 200.

Before initiating the next switching cycle, the pulse generator 700 will produce a sampling pulse $V_{SP3}$ for acquiring a sampled voltage $V_{SH}$ from the signal buffer. In response to the sampled voltage $V_{SH}$, the double sample amplifier 200 will generate a clamped-sample voltage $V_{HSH}$ for supplying to the oscillator 300. In order to eliminate the possibility of sampling a falling edge signal, only the higher voltage in the signal buffer is taken as the sampled voltage $V_{SH}$. The available sampled voltage $V_{SH}$ is acquired just before the transformer current drops to zero. More specifically, the available sampled voltage $V_{SH}$ is acquired when the current of the secondary winding $N_S$ of the transformer 50 drops to a minimum value. Sampling the flyback voltage $V_{P1}$ during a minimum secondary current reduces the error margin from the voltage drop of the output rectifier 19. The ZCD comparator 900 outputs a ZCD signal $V_{ZCD}$ to indicate a zero current status once the voltage at the detection input VS drops below a lower-limit voltage. The lower-limit voltage is the threshold voltage 910 plus an output voltage $V_H$ of the signal buffer. The flyback voltage $V_{P1}$ is sampled through a detection resistor 23 shown in FIG. 2.

The sampled voltage $V_{SH}$ is used for voltage regulation. One problem is that the voltage drop across the output rectifier 19 varies with respect to temperature. In order to compensate for this, an offset current source of the PWM controller 100 pulls an offset current $I_M$ from the detection input VS. The offset current $I_M$ is decreased in proportion to the increase of the temperature. The offset current $I_M$ produces a voltage drop across the detection resistor 23 so that the voltage drop is proportional to the voltage drop across the output rectifier 19. By properly selecting the resistance of the detection resistor 23, it is possible to accurately offset the variation of the voltage drop across the output rectifier 19. When the variation of the voltage drop across the detection resistor 23 is correlated to the variation of the voltage drop across the output rectifier 19, the detection resistor 23 can adequately compensate for the temperature coefficient of the output rectifier 19. In this manner, the flyback power converter according to the present invention can supply a well-regulated output voltage over a wide range of operating temperatures.

As shown in FIG. 3, the oscillator 300 of the PWM controller 100 produces the programmable switching frequency in response to the clamped-sample voltage $V_{HSH}$, and thus controls the power delivered from the primary-side of the transformer to the output of the power converter. The clamped-sample voltage $V_{HSH}$ is correlated to the output voltage $V_O$. Thus, the switching frequency will vary in proportion to the output voltage $V_O$. With a programmable switching frequency, the flyback power converter according to the present invention can maintain a constant output current $I_O$.

The PWM controller 100 generates the PWM signal $V_{PWM}$ from a feedback voltage $V_{COM}$, a limit voltage $V_{LIMIT}$, and the current-sense voltage $V_{IS}$. The PWM signal $V_{PWM}$ is used for PWM control. The PWM signal is generated such that the output voltage and the output current are both well regulated.

Figure 4:
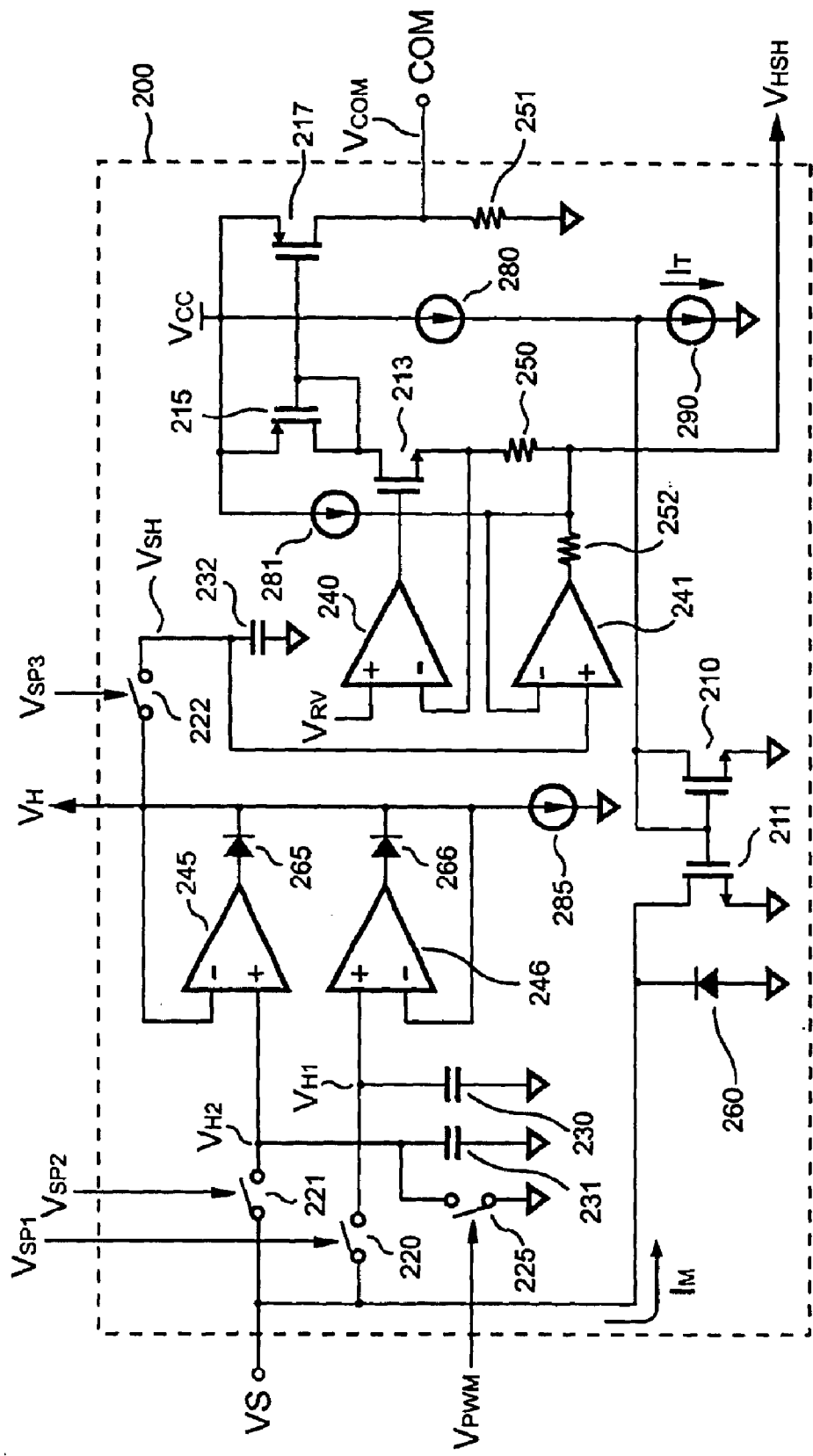
FIG. 4 shows a preferred embodiment of a double sample amplifier of the PWM controller according to the present invention.

FIG. 4 shows a preferred embodiment of the double sample amplifier 200 of the PWM controller 100 according to the present invention. In this embodiment, the detection input VS is connected to an input terminal of a switch 220 and to an input terminal of a switch 221. The switch 220 is turned on/off by the sampling pulse $V_{SP1}$. An output terminal of the switch 220 is connected to a capacitor 230 to produce a hold voltage $V_{H1}$. The capacitor 230 is further connected to a positive terminal of an operational amplifier 246. The switch 221 is turned on/off by the sampling pulse $V_{SP2}$. An output terminal of the switch 221 is connected to a capacitor 231 to produce a hold voltage $V_{H2}$. The capacitor 231 is connected in parallel with a switch 225. The PWM signal $V_{PWM}$ will control the switch 225 to discharge the capacitor 231 during each switching cycle. The capacitor 231 is further connected between a positive terminal of an operational amplifier 245 and the ground reference. The operational amplifier 245, the operational amplifier 246, the capacitor 230, the capacitor 231, a diode 266, and a diode 265 develop the signal buffer of the double sample amplifier 200. The signal buffer outputs the voltage $V_H$. Via the diodes 266 and 265, an output of the operational amplifier 246 and an output of the operational amplifier 245 are connected to the output of the signal buffer. A negative terminal of the operational amplifier 246 and a negative terminal of the operational amplifier 245 are also connected to the output of the signal buffer. Therefore, the magnitude of the signal buffer output voltage $V_H$ is equal to the maximum of the voltages $V_{H1}$ and $V_{H2}$.

The double sample amplifier 200 of the PWM controller 100 further includes a current source 285 connected from the output of the signal buffer to the ground reference. This is done in order to pull the signal buffer signal low. To acquire the sampled voltage $V_{SH}$ from the output of the signal buffer, a switch 222 is turned on/off by the sampling pulse $V_{SP3}$. An input terminal of the switch 222 is connected to the output of the signal buffer. A capacitor 232 for holding the sampled voltage $V_{SH}$ is connected to an output terminal of the switch 222. The capacitor 232 is further connected to a positive terminal of an operational amplifier 241. The output of the operational amplifier 241 is connected to a first terminal of a resistor 252. A second terminal of the resistor 252 outputs the clamped-sample voltage $V_{HSH}$. A negative terminal of the operational amplifier 241 is connected to the second terminal of the resistor 252. The operational amplifier 241 keeps the clamped-sample voltage $V_{HSH}$ equal to the sampled voltage $V_{SH}$, as long as the clamped-sample voltage $V_{HSH}$ is higher than a minimum voltage value $V_{MIN}$. A current source 281 is connected to the second terminal of the resistor 252. The current source 281 and the resistor 252 are used to produce the minimum voltage value $V_{MIN}$ for the clamped-sample voltage $V_{HSH}$.

The double sample amplifier 200 of the PWM controller 100 further includes an operational amplifier 240 having a positive terminal connected to a reference voltage terminal $V_{RV}$. An output of the operational amplifier 240 drives a gate of a transistor 213. A negative terminal of the operation amplifier 240 is connected to a source of the transistor 213. The source of the transistor 213 is further connected to the second terminal of the resistor 252 via a resistor 250. A drain of the transistor 213 is connected to a current mirror. The current mirror comprises a transistor 215 and a transistor 217. The transistor 215 is an input of the current mirror. A drain of the transistor 217 is connected to a resistor 251, to produce the feedback voltage $V_{COM}$ at the COM input of the PWM controller 100. In this manner as described above, an error amplifier is provided for the voltage feedback loop of the PWM controller 100. The resistor 250 determines the gain of the error amplifier, and the capacitor 37 shown in the FIG. 2 determines the bandwidth of the error amplifier.

The double sample amplifier 200 of the PWM controller 100 further includes a current source 280 and a programmable current generator 290 connected in series. A junction of the current source 280 and the programmable current generator 290 is connected to an input of the offset current source. The offset current source comprises a diode 260, a transistor 210 and a transistor 211. A drain of the transistor 210 is the input of the offset current source. To sink the offset current $I_M$, the detection input VS is connected to a drain of the transistor 211. The programmable current generator 290 generates a programmable current $I_T$ that is inversely proportional to temperature variation. Therefore, the amplitude of the offset current $I_M$ is inversely proportional to temperature variation, such that the offset current $I_M$ decrease in response to temperature increases.

Figure 5:
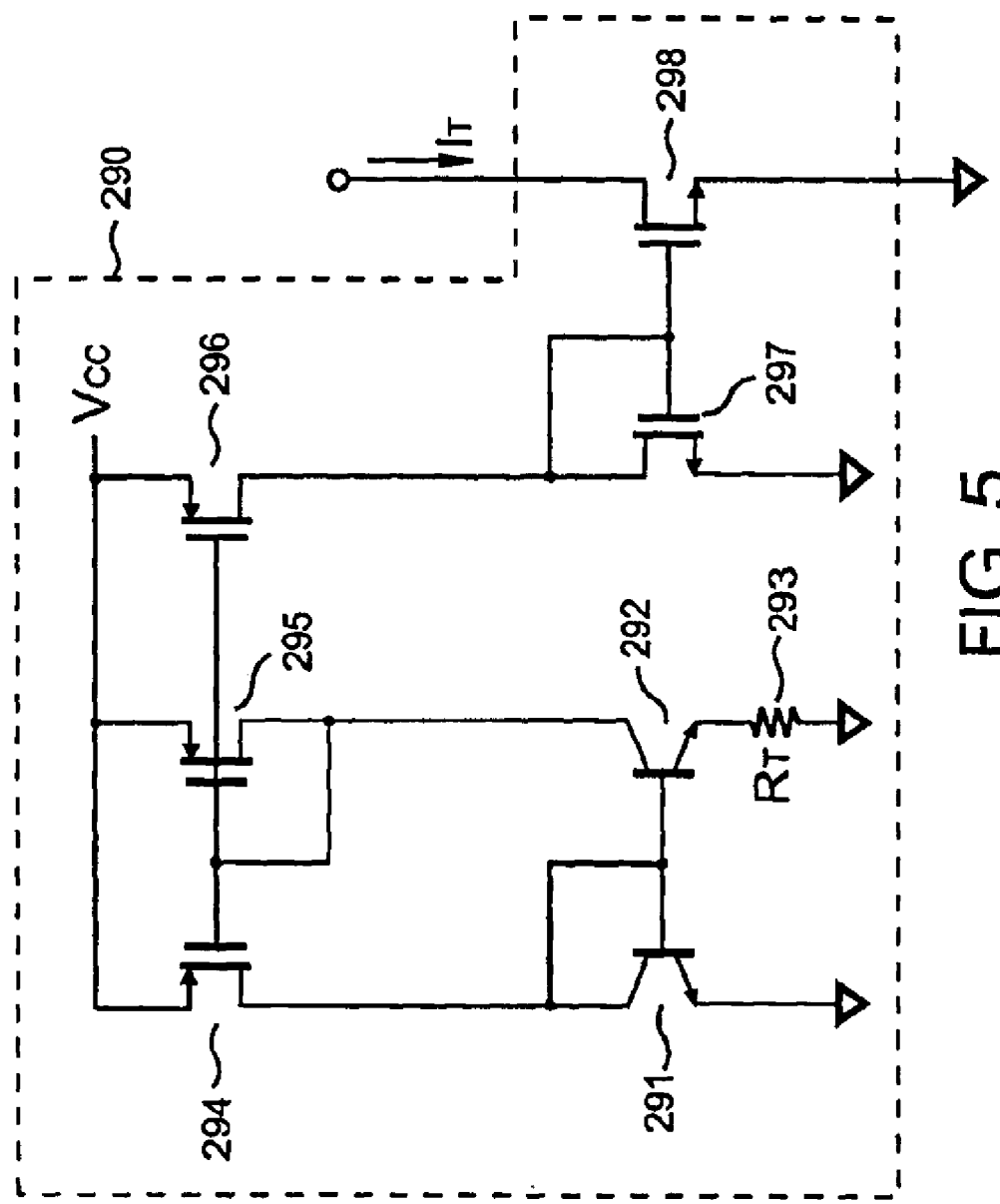
FIG. 5 shows a preferred embodiment of a programmable current generator of the double sample amplifier according to the present invention.

FIG. 5 shows a preferred embodiment of the programmable current generator 290 that generates the programmable current $I_T$ in response to temperature variation. The programmable current generator 290 comprises bipolar transistors 291 and 292, p-mirror transistors 294, 295 and 296, n-mirror transistors 297 and 298 and a resistor 293. The programmable current $I_T$ is given by, $$I_T = N_M \times \frac{k \times T_{emp}}{q} \times \frac{\ln(r)}{R_T} \qquad (1)$$

where $R_T$ is the resistance of the resistor 293; $N_M = M_1 \times M_2$; $M_1$ is the geometrical ratio of the transistor 295 and 296; $M_2$ is the geometrical ratio of the transistor 297 and 298; k is the Boltzmann's constant; q is the charge on an electron; r is the emitter area ratio of the bipolar transistor 291 and 292; and $T_{emp}$ is the absolute temperature.

Figure 6:
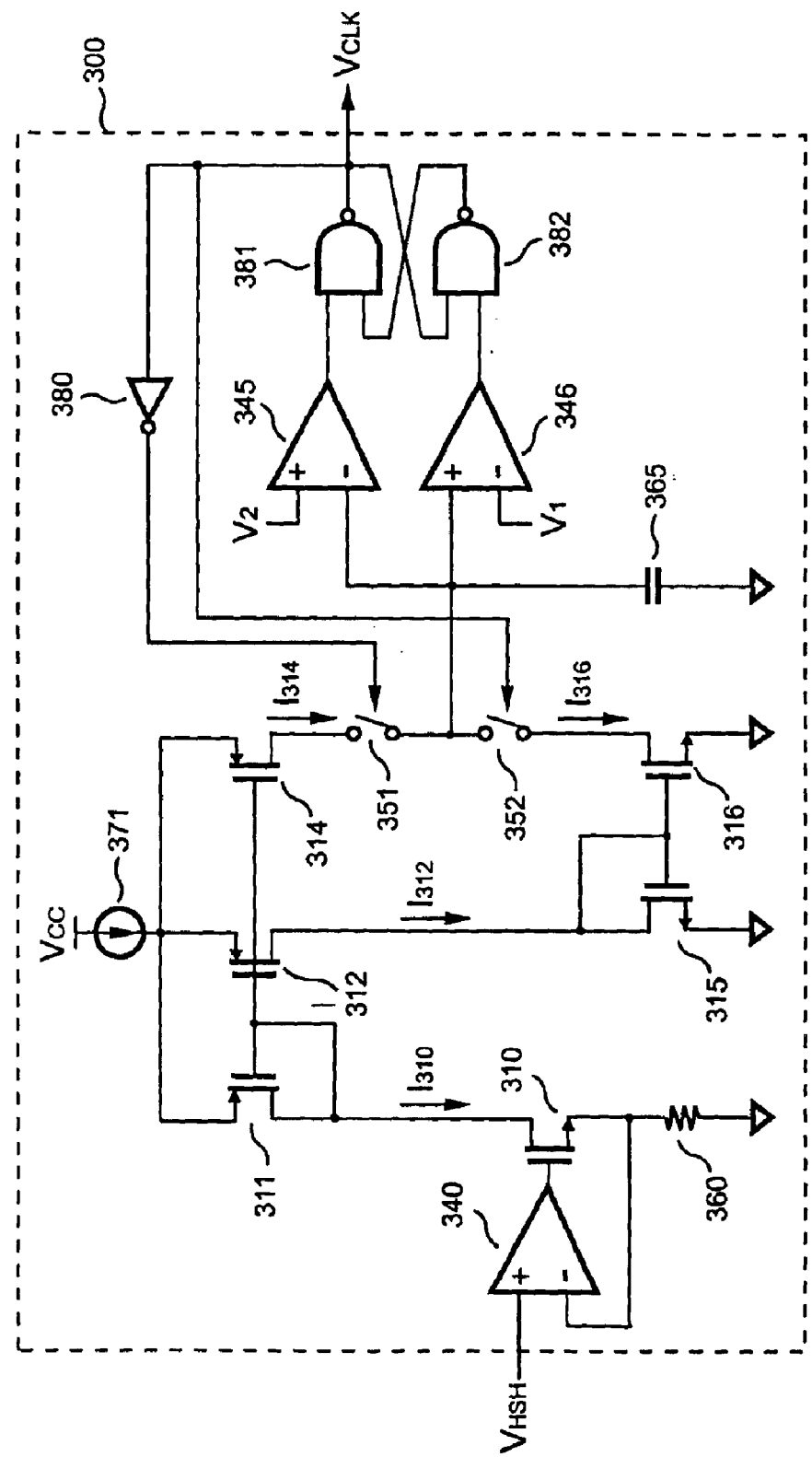
FIG. 6 shows a preferred embodiment of an oscillator of the PWM controller according to the present invention.

FIG. 6 shows a preferred embodiment of the oscillator 300 of the PWM controller 100 according to the present invention. In this embodiment, the clamped-sample voltage $V_{HSH}$ is supplied to a positive input of an operational amplifier 340. The operational amplifier 340 is coupled to a transistor 310 and a resistor 360, to generate a variable charge current $I_{310}$. A transistor 311 paired with a transistor 312 produce a first discharge current $I_{312}$ by mirroring the variable charge current $I_{310}$. The pair of transistors 311 and 314 produces a charge current $I_{314}$ by mirroring the variable charge current $I_{310}$. A transistor 315 paired with a transistor 316 produces a second discharge current $I_{316}$ by mirroring the first discharge current $I_{312}$. A switch 351 is used to enable and disable the charge current $I_{314}$. A switch 352 is used to enable and disable the second discharge current $I_{316}$. The charge current $I_{314}$ and the second discharge current $I_{316}$ are supplied to a capacitor 365, to generate a saw-tooth signal. A comparator 345, a comparator 346, a reference voltage $V_2$, a reference voltage $V_1$, a NAND-gate 381, and a NAND-gate 382, are coupled to generate a clock signal $V_{CLK}$ to control the switch 352. The clock signal $V_{CLK}$ also controls the switch 351 via an inverter 380.

Figure 7:
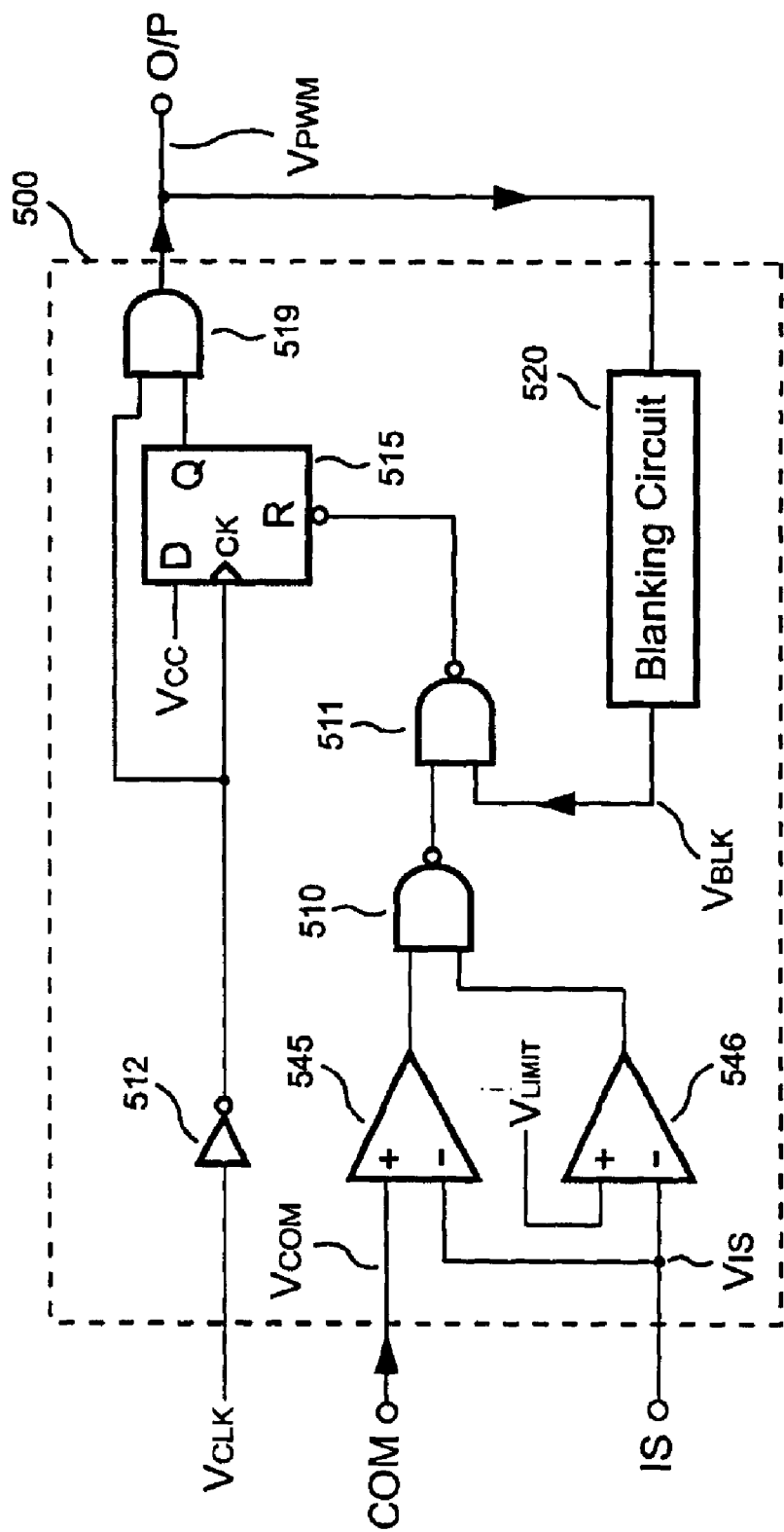
FIG. 7 shows a preferred embodiment of a PWM circuit of the PWM controller according to the present invention.

FIG. 7 shows a preferred embodiment of the PWM circuit 500 of the PWM controller 100 according to the present invention. The PWM circuit 500 comprises a comparator 545, a comparator 546, a NAND-gate 510, a NAND-gate 511, a flip-flop 515, an inverter 512, an AND-gate 519, and a blanking circuit 520. A negative input of the comparator 545 and a negative input of the comparator 546 are connected to the current-sense input IS of the PWM controller 100. The comparator 545 is used to compare the feedback voltage $V_{COM}$ with the current-sense voltage $V_{IS}$. The comparator 546 is used to compare a limit voltage $V_{LIMIT}$ with the current-sense voltage $V_{IS}$. The limit voltage $V_{LIMIT}$ is used to limit the peak primary current of the transformer 50. An output of the comparator 545 is connected to a first input of the NAND-gate 510. An output of the comparator 546 is also connected to a second input of the NAND-gate 510. A first input of the NAND-gate 511 is connected to an output of the NAND-gate 510. A second input of the NAND-gate 511 is connected to an output of the blanking circuit 520. The clock signal $V_{CLX}$ is supplied to a clock input of the flip-flop 515 via the inverter 512, which is further connected to a first input of the AND-gate 519. The flip-flop 515 is reset by an output of the NAND-gate 511. An input of the flip-flop 515 is supplied from the supply voltage $V_{CC}$. An output of the flip-flop 515 connects to a second input of the AND-gate 519. An input of the flip-flop 515 is supplied from the supply voltage $V_{CC}$. An output of the AND-gate 519 supplies the PWM signal $V_{PWM}$ to an input of the blanking circuit 520. The blanking circuit 520 generates a blanking signal $V_{BLK}$ to ensure a minimum on-time for the PWM signal $V_{PWM}$.

Figure 8:
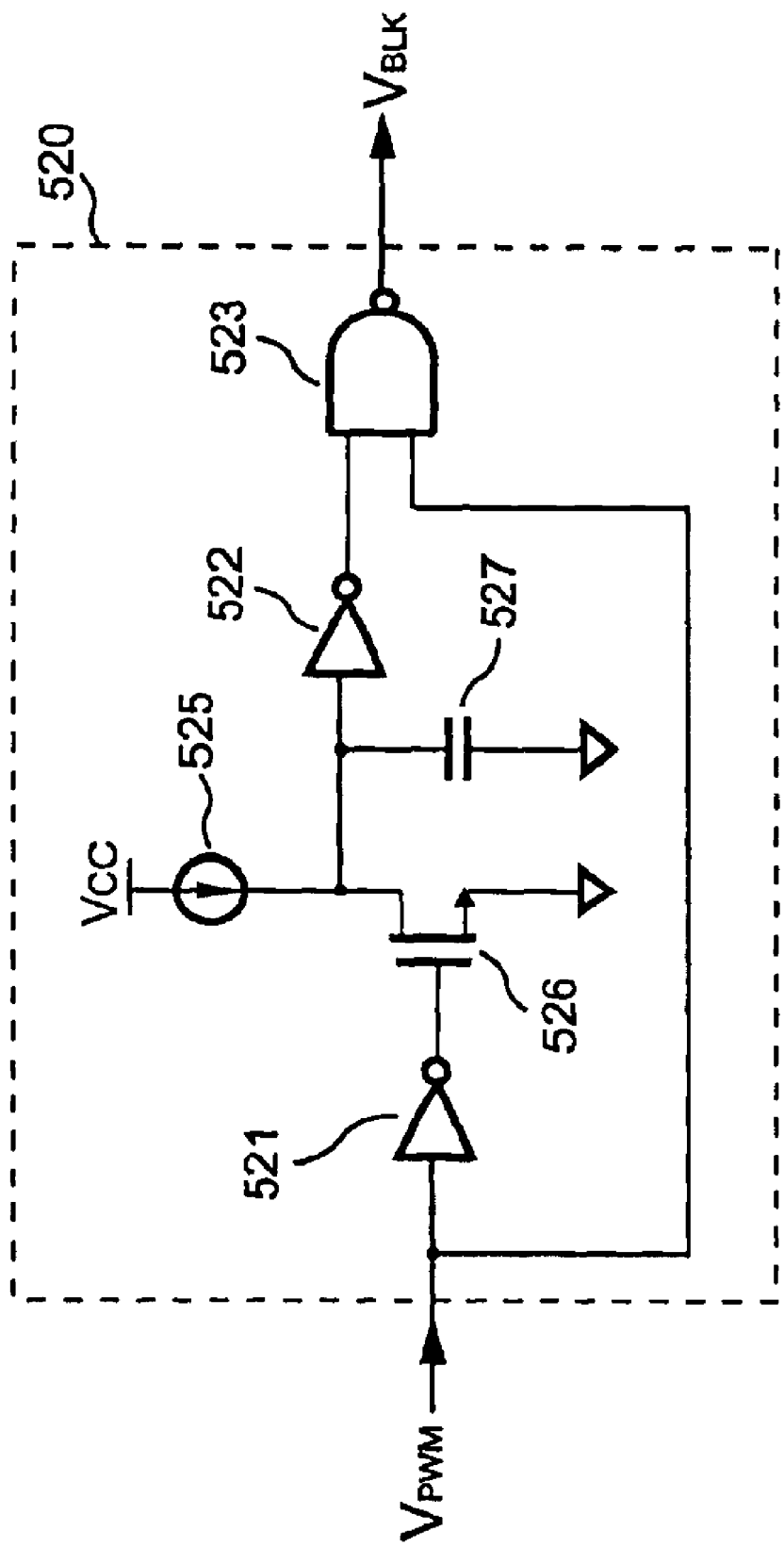
FIG. 8 shows a preferred embodiment of a blanking circuit of the PWM circuit according to the present invention.
Figure 10:
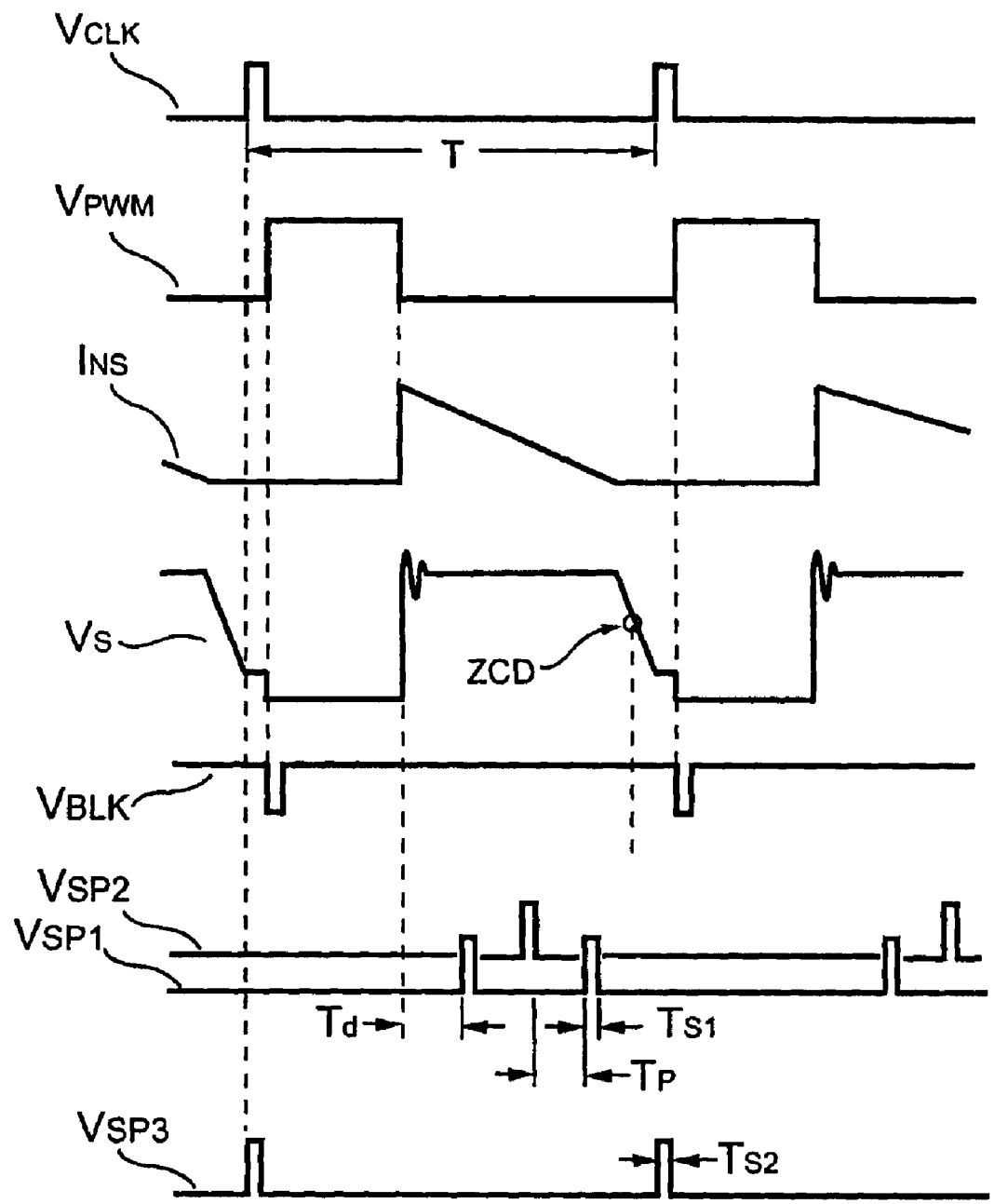
FIG. 10 is a timing diagram showing signals generated by the PWM circuit and the flyback power converter according to the present invention.

FIG. 8 shows a preferred embodiment of the blanking circuit 520 of the PWM circuit 500 according to the present invention. The blanking circuit 520 comprises an inverter 521, an inverter 522, a NAND-gate 523, a transistor 526, a capacitor 527, and a current source 525. The purpose of the blanking circuit 520 is to generate the blanking signal $V_{BLK}$. The PWM signal $V_{PWM}$ is supplied to an input of the inverter 521 and a first input of the NAND-gate 523. The transistor 526 is coupled with the current source 525, the capacitor 527, and the inverter 522, to produce a blanking time $T_{BLK}$. An output of the inverter 521 drives a gate of the transistor 526 to start the blanking time $T_{BLK}$, once the PWM signal $V_{PWM}$ is on. An output of the inverter 522 is connected to a second input of the NAND-gate 523. An output of the NAND-gate 523, which is an output of the blanking circuit 520, generates the blanking signal $V_{BLK}$. Its waveform is shown in FIG. 10.

Figure 9:
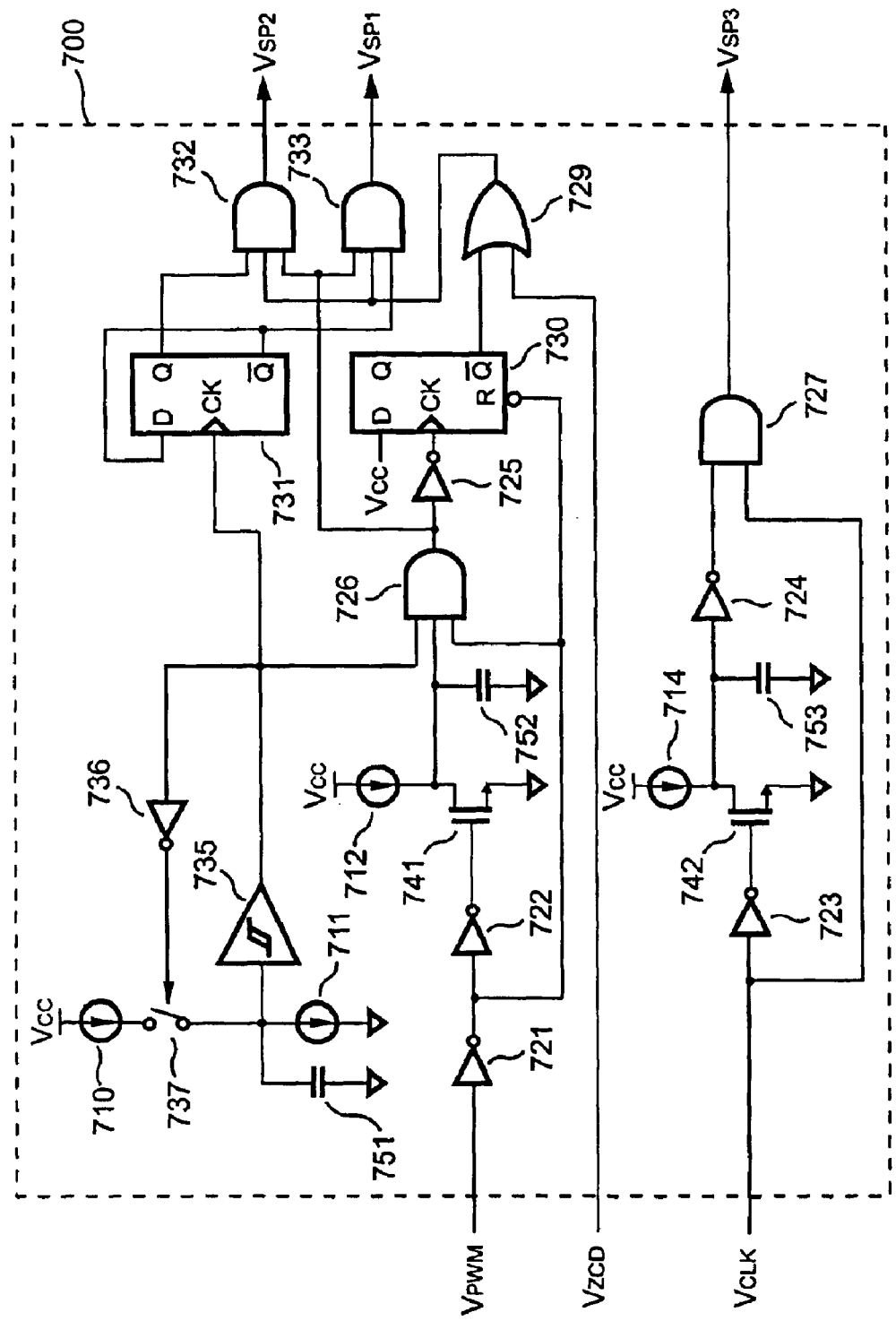
FIG. 9 shows a preferred embodiment of a pulse generator of the PWM controller according to the present invention.

FIG. 9 shows a preferred embodiment of the pulse generator 700 of the PWM controller 100 according to the present invention. To produce a sampling clock signal the pulse generator 700 includes a capacitor 751, an inverter 736, a switch 737, a current source 710, a current source 711, and a hysteresis buffer 735. The capacitor 751 is charged by the current source 710 via the switch 737, and is discharged by the current source 711. The capacitor 751 is connected to an input of the hysteresis buffer 735. The hysteresis buffer 735 outputs a sampling clock signal to control the switch 737 via the inverter 736. The current source 710 and the current source 711 respectively determine an on-time and an off-time of the sampling clock signal. The on-time of the sampling clock signal further determines the sample time $T_{S1}$ for both of the sampling pulse signals $V_{SP1}$ and $V_{SP2}$. To produce a delay time $T_d$ after the PWM signal $V_{PWM}$ goes off, the pulse generator 700 includes a transistor 741, a current source 712, a capacitor 752, an inverter 721, and an inverter 722. The PWM signal $V_{PWM}$ is also supplied to an input of the inverter 721. The output of the inverter 721 drives the inverter 722. The inverter 722 further drives a gate of the transistor 741. When the PWM signal $V_{PWM}$ goes off, the transistor 741 is also turned-off. The current source 712 will then charges the capacitor 752 to produce the delay time $T_d$.

The pulse generator 700 of the PWM controller 100 further comprises an AND-gate 726 having three inputs. A first input is supplied by the sampling clock signal, a second input is connected to the capacitor 752, and a third input is connected to the output of the inverter 721. An output of the AND-gate 726 produces the sampling pulses $V_{SP1}$ and $V_{SP2}$ via an AND-gate 733 and an AND-gate 732 respectively. The AND-gates 732 and 733 are alternately enabled by a flip-flop 731. The sampling clock signal is supplied to a clock input of the flip-flop 731. An output and an inverse-output of the flip-flop 731 are connected to the AND-gates 732 and 733 respectively, thus the sampling pulses $V_{SP1}$ and $V_{SP2}$ can be alternately produced. Furthermore, in order to sample the flyback voltage just before the transformer current drops to zero, the ZCD signal $V_{ZCD}$ controls the AND-gates 732 and 733 via an OR-gate 729.

However, to ensure that the double sample amplifier 200 will produce the sampled voltage $V_{SH}$ during every switching cycle, the ZCD signal $V_{ZCD}$ disables the sampling pulses $V_{SP1}$ and $V_{SP2}$ after they are produced.

The inverse-output of a flip-flop 730 connects to a first input of the OR-gate 729. A second input of the OR-gate 729 is supplied by the ZCD signal $V_{ZCD}$. The flip-flop 730 is reset by the output of the inverter 721. A clock input of the flip-flop 730 is connected to the output of the AND-gate 726 via an inverter 725. Thus, the ZCD signal $V_{ZCD}$ will disable the AND-gates 732 and 733 following either of the sampling pulses, $V_{SP1}$ or $V_{SP2}$.

To produce a sampling pulse $V_{SP3}$ with a pulse width equal to a sample time $T_{S2}$, the pulse generator 700 includes a transistor 742, a current source 714, a capacitor 753, an inverter 723, an inverter 724, and an AND-gate 727. The clock signal $V_{CLK}$ is supplied to an input of the inverter 723 and a first input of the AND-gate 727. An output of the inverter 723 is connected to a gate of the transistor 742 to control the start of the sample time $T_{S2}$. The current source 714 and the capacitor 753 are coupled to produce the sample time $T_{S2}$. The capacitor 753 drives a second input of the AND-gate 727 via the inverter 724. The AND-gate 727 outputs the sampling pulse $V_{SP3}$ with a pulse width equal to the sample time $T_{S2}$.

FIG. 10 shows the timing diagram of the PWM circuit 500 and the pulse generator 700. After the PWM signal goes low, the sampling pulses $V_{SP1}$ and $V_{SP1}$ are alternately generated, following the delay time $T_d$. The purpose of the delay time $T_d$ is to eliminate as much as possible the influence of the leakage inductance of the transformer 50. To accomplish this, the delay time $T_d$ is inserted during each cycle between the falling-edge of the PWM signal $V_{PWM}$ and the beginning of the flyback voltage sampling process. The blanking circuit 520 shown in FIG. 7 produces the blanking time $T_{BLK}$. This determines the minimum on-time of the PWM signal, once the PWM signal is on. The delay time $T_d$ is determined by the minimum on-time of the PWM signal. The blanking time $T_{BLK}$ ensures that the delay time $T_d$ and the sample time $T_{S1}$ and $T_{S2}$ are sufficient to precisely sample the flyback voltage. When a zero current status is detected at the detection input VS, both the sampling pulses $V_{SP1}$ and $V_{SP2}$ will be disabled. The flyback voltage will be sampled and held by the capacitors 230 and 231, depicted in FIG. 4. The sampling pulse $V_{SP3}$ is then generated in response to the clock signal $V_{CLK}$. When the sampling pulse $V_{SP3}$ is generated, the capacitor 232 will further sample and hold the higher voltage stored by the capacitors 230 or 231. Referring now to FIG. 2, the output voltage $V_O$ of the power converter can be expressed as, $$V_O = V_{NS} - V_D = \frac{N_S}{N_{PI}} \times V_{PI} - V_D = \frac{N_S}{N_{PI}} \times (V_{SH} + I_M \times R_{23}) - V_D \quad (2)$$

where $V_{NS}$ is the voltage across the secondary winding $N_S$, $V_{P1}$ is the voltage of the first primary winding, $V_D$ is the voltage drop across the output rectifier 19, $V_{SH}$ is the voltage sampled at the detection input VS, and $R_{23}$ is the resistance of the detection resistor 23. The output voltage $V_O$ can also be expressed in terms of the PWM feedback-control circuit:

$$V_O = G_M \times (V_{RV} - V_{SH}) \quad (3)$$

where $G_M$ is the loop gain of the PWM feedback-control circuit and $V_{RV}$ is the reference voltage of the double sample amplifier 200. Based on equations (2) and (3), the output voltage can be rewritten as, $$V_O = \left\{ \frac{N_S}{N_{PI}} \times V_{RV} + \left[ \left(\frac{N_S}{N_{PI}} \times I_M \times R_{23}\right) - V_D \right] \right\} \div \left\{ 1 + \left( \frac{N_S}{N_{PI}} \times \frac{1}{G_M} \right) \right\}$$

Because $G_M \gg 1$, $V_O$ can be expressed in a simplified form as, $$V_O = \frac{N_S}{N_{PI}} \times V_{RV} + \left[ \left( \frac{N_S}{N_{PI}} \times I_M \times R_{23} \right) - V_D \right] \quad (4)$$

The flyback voltage is sampled just before the transformer current drops to zero. The problem is that the voltage drop across the output rectifier 19 varies with respect to temperature.

To compensate for this, the present invention introduces the offset current $I_M$. The offset current $I_M$ is modulated in inverse proportion to temperature variation. By properly selecting the resistance of the detection resistor 23, it is possible to offset the adverse temperature effect of the voltage drop across the output rectifier 19. Thus, the flyback power converter according to the present invention can supply a well-regulated output voltage $V_O$.

The oscillator 300 produces the clock signal $V_{CLK}$ with a programmable switching frequency. The switching frequency is determined in response to the clamped-sample voltage $V_{HSH}$. This controls the power delivered from the primary-side of the transformer to the output of the power converter. Because the clamped-sample voltage $V_{HSH}$ is correlated to the output voltage $V_O$, the switching frequency will be proportional to output voltage $V_O$. Using the programmable switching frequency, the flyback power converter according to the present invention can maintain a constant output current $I_O$.

Since the output power is a function of the output voltage $V_O$, a constant current output can be achieved when the output current of the power converter is always less than a maximum value. The output power $P_O$ is given by, $$P_O = V_O \times I_O = \eta \times P_{IN} = \eta \times \frac{1}{2 \times T} \times L_P \times I_P^2 \quad (5)$$

where PIN is the power input to the primary-side, $\eta$ is the power conversion efficiency, T is the switching period, $L_P$ is the primary inductance of the transformer 50, and $I_P$ is the primary current of the transformer 50.

The primary current $I_P$ produces the current-sense voltage $V_{IS}$ across the current-sense resistor 25. The current-sense resistor 25 is connected to the current-sense input IS of the PWM controller 100. Once the current-sense voltage $V_{IS}$ exceeds the limit voltage $V_{LIMIT}$, the logic circuit of the PWM controller 100 will turn off the PWM signal to keep the primary current $I_P$ constant. Referring to equation (5), the output current $I_O$ of the power converter can be shown as, $$I_O = \frac{1}{V_O} \times \frac{\eta}{2 \times T} \times L_P \times (I_P)^2 \quad (6)$$

In order to produce a constant output current $I_O$, when $V_{O2} = 0.5 \times V_{O1}$ ($P_{O2} = 0.5 \times P_{O1}$), T should be increased as follows:

$$T_2 = 2 \times T_1$$

where the first switching period $T_1$ refers to the first output voltage $V_{O1}$, and the second period of the switching frequency $T_2$ refers to the second output voltage $V_{O2}$.

The oscillator 300 generates the clock signal $V_{CLK}$ with a programmable switching frequency. The switching frequency is determined in response to the clamped-sample voltage $V_{HSH}$. When the clamped-sample voltage $V_{HSH}$ exceeds the minimum voltage $V_{MIN}$, the clamped-sample voltage $V_{HSH}$ is equal to the sampled voltage $V_{SH}$. If the clamped-sample voltage $V_{HSH}$ goes below the minimum voltage value $V_{MIN}$, the switching frequency of the oscillator 300 will be insufficient to operate the PWM controller 100. To prevent this from happening, the clamped-sample voltage $V_{HSH}$ will be set to the minimum voltage value $V_{MIN}$, whenever it starts to dip below $V_{MIN}$.

Referring to equation (2), the sampled voltage $V_{SH}$ is per se a function of the output voltage $V_O$. Therefore a constant output current can be easily achieved by reducing the switching period to $(2 \times T)$, whenever the output voltage is decreased to $(0.5 \times V_O)$.

As described above, the flyback power converter includes the PWM controller 100, to generate the offset current $I_M$ and the sampled voltage $V_{SH}$. The sampled voltage $V_{SH}$ is generated during every PWM cycle in response to the flyback voltage sampled across the first primary winding. In this manner, the flyback power converter according to the present invention can keep the output voltage constant. To limit the power transferred through the primary winding, the switching frequency is generated in response to the output voltage $V_O$. In this manner, the flyback power converter according to the present invention keeps the output current constant.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flyback power converter comprising:
   a transformer having a secondary winding, a first primary winding, and a second primary winding, wherein said first primary winding has a first terminal and a second terminal, said second primary winding has a first terminal and a second terminal, wherein said second terminal of said first primary winding is connected to said first terminal of said second primary winding, and said second terminal of said second primary winding is connected to a ground reference;
   an output rectifier connected from said secondary winding to an output of the power converter;

a switching transistor for controlling the voltage across the primary windings of the transformer, wherein a drain of said switching transistor is connected to an input of the power converter;

a current-sense resistor for generating a current-sense voltage, wherein said current-sense resistor is connected between a source of said switching transistor and said first terminal of said first primary winding;

a PWM controller for regulating a switching frequency and for providing a PWM signal to drive a gate of said switching transistor, wherein said PWM controller has a supply-voltage input for receiving power, a detection input for receiving a flyback voltage, a current-sense input for current detection, a compensation input for frequency compensation, and a ground-reference input connected to said first terminal of said first primary winding, and wherein said current-sense input is connected to said source of said switching transistor;

a power-pin capacitor for starting up said PWM controller, wherein said power-pin capacitor is connected between said supply-voltage input of said PWM controller and said ground-reference input of said PWM controller;

a start-up resistor for charging said power-pin capacitor, wherein said start-up resistor is connected from said input of the power converter to said supply-voltage input of said PWM controller;

a power-pin diode connected from said second terminal of said first primary winding to said supply-voltage input of said PWM controller;

a detection resistor for receiving an offset current to compensate for the voltage drop across said output rectifier, wherein said detection resistor is connected from said second terminal of said first primary winding to said detection input of said PWM controller;

a compensation capacitor connected from said compensation input of said PWM controller to said ground-reference input of said PWM controller;

a transient voltage suppressor connected in parallel with said second primary winding; and a snubber diode connected in series with said transient voltage suppressor.

2. The flyback power converter as claimed in claim 1, wherein the output current of the power supply and the output voltage of the power supply are regulated in a substantially constant manner.

3. The flyback power converter as claimed in claim 1, wherein said flyback voltage is reflected from said secondary winding to said first primary winding and said second primary winding of said transformer, wherein said flyback voltage is reflected in response to the falling edge of said PWM signal.

4. The flyback power converter as claimed in claim 1, wherein a sampled voltage is sampled from said flyback voltage through said detection input of said PWM controller, and said flyback voltage is sampled after the falling-edge of said PWM signal and is sampled before the transformer current drops to zero.

5. The flyback power converter as claimed in claim 1, wherein a primary current of said transformer is produced during the on-time of said PWM signal, and said primary current of said transformer generates a current-sense voltage across said current-sense resistor.

6. The flyback power converter as claimed in claim 1, wherein said offset current is pulled from said detection input of said PWM controller, and said offset current is modulated so that the amplitude is inversely proportional to the operating temperature of the flyback power converter.

7. The flyback power converter as claimed in claim 1, wherein said PWM signal is modulated in a manner that the DC output voltage is kept substantially constant in response to said sampled voltage.

8. The flyback power converter as claimed in claim 1, wherein said switching frequency is controlled in response to a clamped-sample voltage of the PWM controller and is controlled in a manner that keeps the output current of the flyback power converter substantially constant.

9. The flyback power converter as claimed in claim 1, wherein said PWM controller comprises:

a double sample amplifier for sampling said flyback voltage from said detection input of said PWM controller, wherein said double sample amplifier produces said clamped-sample voltage, said sampled voltage obtained from said detection input of said PWM controller, and a feedback voltage obtained by amplifying said sampled voltage;

an oscillator for regulating said switching frequency and for producing a clock signal in response to said clamped-sample voltage, wherein said clamped-sample voltage is obtained by clamping said sampled voltage;

a PWM circuit for generating said PWM signal, wherein said PWM signal is a function of said feedback voltage, said current-sense voltage, and a limit voltage;

a pulse generator for generating sampling pulses in response to said PWM signal and said clock signal, wherein said flyback voltage is sampled in response to said sampling pulses;

a hysteresis comparator for measuring the current flow through said transformer; and a threshold voltage source connected to said hysteresis comparator.

10. The PWM controller as claimed in claim 9, wherein said double sample amplifier comprises:

a first switch and a second switch having input terminals connected to said detection input of said PWM controller, wherein said first switch and said second switch are respectively turned on/off by a first sampling pulse and a second sampling pulse;

a first capacitor and a second capacitor connected to an output terminal of said first switch and an output of said second switch respectively, wherein said first capacitor produces a first hold voltage and said second capacitor produces a second hold voltage;

a discharge switch connected from said second capacitor to the ground reference, wherein said discharge switch is turned on/off by said PWM signal;

a signal buffer consisting of a first operational amplifier, a second operational amplifier, said first capacitor, said second capacitor, a first diode, and a second diode, wherein said first operational amplifier and said second operational amplifier respectively have positive input terminals connected to said second capacitor and said first capacitor, wherein an output of said signal buffer further connects to a negative input terminal of said first operational amplifier and a negative input terminal of said second operational amplifier, and wherein said first diode and said second diode are respectively connected from output terminals of said first operational amplifier and said second operational amplifier to said output of said signal buffer;

a third switch having an input terminal connected to said output of said signal buffer, wherein said third switch is turned on/off by a third sampling pulse;

a third capacitor for producing said sampled voltage, wherein said third capacitor is connected to an output terminal of said third switch;

a third operational amplifier having a positive input terminal connected to said third capacitor;

a clamp resistor connecting to an output of said third operational amplifier, wherein said third operational amplifier outputs said clamped-sample voltage via said clamp resistor, wherein a negative input terminal of said third operational amplifier is coupled to said clamp resistor;

a clamp current source for ensuring that said clamped sample voltage exceeds a minimum voltage level, wherein said clamp current source is connected to said clamp resistor;

a first DSA transistor;

a fourth operational amplifier having an output terminal for driving a gate of said first DSA transistor, wherein a negative input terminal of said fourth operational amplifier is connected to a source of said first DSA transistor;

a gain resistor coupled to said negative input terminal of said fourth operational amplifier and said source of said first DSA transistor;

a DSA reference voltage source for providing a reference voltage for said double sample amplifier, wherein said DSA reference voltage source is connected to a positive input terminal of said fourth operational amplifier;

a first current mirror consisting of a first input transistor and a first output transistor, wherein a drain of said first input transistor is connected to a drain of said first DSA transistor;

a DSA output resistor for generating said feedback voltage, wherein said DSA output resistor is connected to a drain of said first output transistor;

a reference current source;

a programmable current generator connected to said reference current source, wherein said programmable current generator produces a programmable current, and the amplitude of said programmable current is modulated to be inversely proportional to the operating temperature of the flyback power converter;

an offset current mirror having an input terminal connected to a joint of said programmable current generator and said reference current source, wherein an output terminal of said offset current mirror is connected to said detection input of said PWM controller, and said output terminal of said offset mirror current pulls said offset current; and a DSA-input diode connected from said detection input of said PWM controller to the ground reference.

11. The double sample amplifier as claimed in claim 10, wherein the magnitude of the output voltage of said double sample amplifier is equal to the magnitude of the maximum of said first hold voltage and said second hold voltage.

12. The double sample amplifier as claimed in claim 10, wherein said programmable current generator comprises:

a second current mirror consisting of a second input transistor, a second left-output transistor and a second right-output transistor, wherein the supply voltage is supplied to said second current mirror;

a bipolar current mirror consisting of an input bipolar transistor and an output bipolar transistor; wherein a collector of said input bipolar transistor is connected to a drain of said second left-output transistor, and a collector of said output bipolar transistor is connected to a drain of said second input transistor;

a first resistor connected between an emitter of said output bipolar transistor and the ground reference; and a third current mirror consisting of a third input transistor and a third output transistor, wherein a drain of said third output transistor pulls said programmable current.

13. The PWM controller as claimed in claim 9, wherein said oscillator comprises:

a variable current generator for receiving said clamped-sample voltage, wherein said variable current generator comprises an error amplifier, a V-to-I transistor, and a second resistor;

a fourth current mirror for generating a fourth mirror current and an OSC charge current, wherein said fourth current mirror comprises a fourth input transistor, a fourth left-output transistor and a fourth right-output transistor;

a fifth current mirror consisting of a fifth input transistor and a fifth output transistor, wherein a drain of said fifth input transistor receives said fourth mirror current and pulls an OSC discharge current;

an first inverter;

an OSC capacitor;

a first comparator and a second comparator, wherein a second reference voltage is supplied to a positive input terminal of said first comparator, and a first reference voltage is supplied to a negative input terminal of said second comparator;

an OSC current source;

a fourth switch for conducting the OSC charge current, wherein said fourth switch is controlled by an output of said first inverter;

a fifth switch for conducting said OSC discharge current; and a first NAND-gate and a second NAND-gate, wherein said first NAND-gate produces said clock signal controlling said fifth switch and drives an input of said first inverter.

14. The PWM controller as claimed in claim 9, wherein said PWM circuit comprises:

a second inverter;

a third comparator for comparing said feedback voltage with the current-sense voltage;

a fourth comparator for comparing said limit voltage with said current-sense voltage;

a third NAND-gate having a first input terminal connected to an output terminal of said third comparator, wherein said third NAND-gate has a second input terminal connected to an output of said fourth comparator;

a fourth NAND-gate having a first input terminal, wherein a first input terminal of said fourth NAND-gate is driven by an output of said third NAND-gate;

a first AND-gate for supplying said PWM signal;

a first flip-flop having a clock input driven by an output of said second inverter; and a blanking circuit having an input terminal driven by said PWM signal, wherein said blanking circuit has an output terminal connected to a second input terminal of said fourth NAND-gate.

15. The PWM circuit as claimed in claim 14, wherein said blanking circuit comprises:

a means for producing a blanking time comprising a BLK transistor, a BLK current source, a BLK capacitor, and a BLK inverter;

a BLK input inverter for supplying said PWM signal to a gate of said BLK transistor, wherein said PWM signal is supplied to an input of said BLK input inverter, said input df said BLK input inverter is an input terminal of said blanking circuit, and said blanking time starts substantially soon following each rising-edge of the PWM signal; and a BLK NAND-gate for supplying a blank signal, wherein said PWM signal is supplied to a first input of said BLK NAND-gate, and said BLK NAND-gate has a second input connected to an output of said BLK inverter.

16. The PWM controller as claimed in claim 9, wherein said pulse generator comprises:

a means for producing a sampling clock signal comprising a first PG current source, a first PG switch, a second PG current source, a first PG capacitor, a PG hysteresis buffer and a first PG inverter, wherein said first PG current source and said second PG current source respectively determine an on-time and an off-time of said sampling clock signal;

a means for producing a delay time comprising a second PG inverter, a third PG inverter, a first PG transistor, a third PG current source and a second PG capacitor;

a second AND-gate for generating a first sampling pulse;

a third AND-gate for generating a second sampling pulse;

a second flip-flop for enabling/disabling said second AND-gate and said third AND-gate;

a third flip-flop;

a fourth PG inverter;

an OR-gate having a first input for receiving an inverse output of said third flip-flop and a second input for receiving an output of said hysteresis comparator;

a fourth AND-gate having a first input terminal for receiving said sampling clock signal, a second input terminal coupled to said second PG capacitor, and a third input terminal connected to an output of said second PG inverter; and a means for producing said third sampling pulse comprising a fifth PG inverter, a second PG transistor, a fourth PG current source, a third PG capacitor, a sixth PG inverter, and a fifth AND-gate.

* * * * *